US011167260B2

(12) United States Patent
Park et al.

(10) Patent No.: US 11,167,260 B2
(45) Date of Patent: Nov. 9, 2021

(54) OXYGEN SELECTIVE ADSORBENT FOR EASY DESORPTION AND PREPARATION METHOD THEREOF

(71) Applicant: KOREA INSTITUTE OF ENERGY RESEARCH, Daejeon (KR)

(72) Inventors: Jong-Ho Park, Daejeon (KR); Taesung Jung, Daejeon (KR); Hee-Tae Beum, Daejeon (KR); Jong-Kee Park, Daejeon (KR); Sang-Sup Han, Daejeon (KR); Dong Woo Cho, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 207 days.

(21) Appl. No.: 15/979,947

(22) Filed: May 15, 2018

(65) Prior Publication Data
US 2018/0257058 A1 Sep. 13, 2018

Related U.S. Application Data

(63) Continuation-in-part of application No. 14/316,776, filed on Jun. 26, 2014, now abandoned.

(30) Foreign Application Priority Data

Jun. 28, 2013 (KR) .................. 10-2013-0075908

(51) Int. Cl.
*B01J 20/04* (2006.01)
*B01J 20/30* (2006.01)
(Continued)

(52) U.S. Cl.
CPC ......... *B01J 20/043* (2013.01); *B01J 20/3078* (2013.01); *C01B 13/0262* (2013.01);
(Continued)

(58) Field of Classification Search
CPC ..................................................... B01J 20/043
See application file for complete search history.

(56) References Cited

U.S. PATENT DOCUMENTS

| 2,944,627 | A | | 7/1960 | Skarstom | |
| 3,384,511 | A | * | 5/1968 | Maurer | H01J 1/28 428/471 |

(Continued)

FOREIGN PATENT DOCUMENTS

| DE | 102016004085 A1 * 10/2017 ......... H01L 31/0264 |
| JP | 5-184851 A 7/1993 |

(Continued)

OTHER PUBLICATIONS

Jung, T., et al., "BaxSr1-xO/MgO Nano-Composite Sorbents for Tuning the Transition Pressue of Oxygen: Application to Air Separation", "Chemical Engineering Science", Jul. 3, 2015, pp. 532-540, vol. 137.

(Continued)

*Primary Examiner* — Peter F Godenschwager
(74) *Attorney, Agent, or Firm* — Cantor Colburn LLP

(57) ABSTRACT

The present invention provides an oxygen selective adsorbent containing oxides of $Ba_xSr_{(1-x)}Mg_y(CO_3)_{(1+y)}$ or $Ba_xSr_{(1-x)}CO_3$ particles, increasing transition oxygen partial pressure, and representing high thermal stability and excellent oxygen sorption cavity, by adding another metal such as Sr to Ba which is active element for oxygen adsorption, so as to be capable of desorbing oxygen under lower vacuum even at the same operating temperature than the existing oxygen selective adsorbent; and a preparation method thereof.

15 Claims, 9 Drawing Sheets

(51) Int. Cl.
   *C01F 11/18* (2006.01)
   *C01B 13/02* (2006.01)
   *C01F 11/06* (2006.01)
   *B01D 53/02* (2006.01)

(52) U.S. Cl.
   CPC .............. *C01F 11/06* (2013.01); *C01F 11/18* (2013.01); *C01F 11/185* (2013.01); *C01F 11/188* (2013.01); *B01D 53/02* (2013.01); *B01D 2253/112* (2013.01); *B01D 2253/1124* (2013.01); *B01D 2256/12* (2013.01); *B01D 2257/104* (2013.01); *C01P 2002/50* (2013.01); *C01P 2002/72* (2013.01); *C01P 2002/82* (2013.01); *C01P 2004/03* (2013.01); *C01P 2004/61* (2013.01); *C01P 2004/82* (2013.01)

(56) References Cited

U.S. PATENT DOCUMENTS

| 4,781,735 | A  | 11/1988 | Tagawa et al. |
| 5,015,271 | A  | 5/1991  | Reiss |
| 5,122,164 | A  | 6/1992  | Hirooka et al. |
| 5,735,938 | A  | 4/1998  | Baksh et al. |
| 2008/0128729 | A1 | 6/2008 | Okamoto |
| 2013/0299737 | A1 | 11/2013 | Park et al. |

FOREIGN PATENT DOCUMENTS

| JP | 2008109021 A | 5/2008 |
| KR | 1998-070453 A | 10/1998 |
| KR | 1020100047260 A | 5/2010 |
| KR | 10-2010-0066744 A | 6/2010 |
| KR | 1020110054992 A | 5/2011 |
| KR | 10-2012-0099316 A | 9/2012 |

OTHER PUBLICATIONS

M. D. Judd et al., "Formation and Surface Properties of Electron-Emissive Coatings III. Thermal Decomposition and Sintering of Some Co-Precipitated Alkaline-Earth Carbonates," Journal of Applied Chemistry, Mar. 1970, pp. 69-72, vol. 20, No. 3.

Korean Notice of Allowance for corresponding Korean Patent Application No. 10-2013-0075908 dated Feb. 16, 2015, citing the above reference(s).

William R Brice et al., "Subsolidus phase relations in aragonite-type carbonates. III. The systems MgCO3-CaCO3-BaCO3, MgCO3-CaCO3-SrCO3, and MgCO3-SrCO3-BaCO3", The American Mineralogist, Nov. 1973, pp. 979-985, vol. 58, No. 11-12, XP055147636, ISSN:0003-004X.

Summons to attend oral proceedings issued on Aug. 3, 2018 for European Patent Application No. 14174778.2, citing the above reference.

* cited by examiner (A)

(B)

OXYGEN SELECTIVE ADSORBENT FOR EASY DESORPTION AND PREPARATION METHOD THEREOF

CROSS-REFERENCE TO RELATED APPLICATIONS

This application is a continuation in part under the provisions of 35 U.S.C. § 120 of U.S. patent application Ser. No. 14/316,776 filed Jun. 26, 2014, which claims priority under 35 U.S.C. § 119 of Korean Patent Application No. 10-2013-0075908 filed Jun. 28, 2013. The disclosures of such U.S. patent application and Korean priority patent application are hereby incorporated herein by reference in their respective entireties, for all purposes.

TECHNICAL FIELD

The present invention relates to an oxygen selective adsorbent capable of producing high purity oxygen by adsorbing oxygen from air in a rapid adsorption rate, and a preparation method thereof, and more particularly, to an oxygen selective adsorbent comprising respective oxides of particles prepared by forming crystals of $Ba_xSr_{(1-x)}Mg_y(CO_3)_{(1+y)}$ or $Ba_xSr_{(1-x)}CO_3$ particles, and calcining them at high temperature, and a preparation method thereof.

BACKGROUND ART

The easiest and fastest way to reduce the emission of carbon dioxide is regarded as being a carbon dioxide capture & storage (CCS) method which recovers carbon dioxide from a carbon dioxide generating source and geologically stores it. A CCS technology is broadly divisible into carbon dioxide recovery, transfer and storage, and among them, the recovery cost of carbon dioxide accounts for 75% of the total cost of CCS. Thus, in order to develop a cost-effective CCS technology, it is desperately required to reduce the recovery cost of carbon dioxide.

In order to cost-effectively reduce carbon dioxide generated in a power generation field, post-combustion treatment technology, pre-combustion treatment technology, and the like are being researched, and much research on integrated gasification combined cycle (IGCC) which is one of pure oxygen combustion and highly efficient power generation technologies, is also currently underway as an alternative. However, in case of pure oxygen combustion and IGCC power generation, high concentration of oxygen is needed to be supplied, and presently oxygen separation using a cryogenic separation process for producing and supplying oxygen consumes 17% of generated electricity, thereby decreasing generation efficiency by about 9%. Thus, it is difficult to secure the economics of a carbon dioxide recovery process using pure oxygen combustion, without developing an oxygen separation process with low cost and high efficiency.

For oxygen separation, an adsorption separation technique currently adopts an adsorbent selectively adsorbing nitrogen in the air Conventional adsorption separation techniques include pressure swing adsorption (PSA) using process of adsorbing nitrogen in the air under high pressure and desorbing it under low pressure, disclosed in Korean Patent Publication No. 1998-070453, U.S. Pat. No. 2,944,627, etc.; vacuum swing adsorption (VSA) which adsorbs nitrogen under normal pressure and desorbs it under vacuum, disclosed in Korean Patent Laid-Open Publication No. 2010-0066744, etc.; or a VPSA process combining PSA and VSA, disclosed in Japanese Patent Publication No. Hei 5-184851 and U.S. Pat. Nos. 4,781,735 and 5,015,271, etc. However, since a large-capacity vacuum pump or compressor was difficult to be developed, a large-capacity adsorption separation process has not been commercialized. In addition, in order to selectively adsorb nitrogen accounting for 80% in the air, an adsorbent amount required per oxygen production unit is increased, so that the size of an adsorption tower is required to be increased.

Thus, in order to overcome the foregoing problems, an oxygen selective adsorbent is used. Since the ratio of nitrogen and oxygen in the air is 80%/20%, the amount of the oxygen selective adsorbent to be used is only ¼ of the nitrogen selective adsorbent, for producing the same amount of oxygen. Thus, miniaturization of the apparatus may be attempted, and a large-capacity adsorption separation technique is easy to be applied.

Barium oxide is a well-known material which reacts with oxygen, and via an oxidation reaction represented by the following Reaction Formula 1, is converted into barium peroxide, thereby adsorbing oxygen in this process, and discharging oxygen via a reduction reaction under oxygen free atmosphere. Thus, barium oxide was also used in a preparation process of oxygen in the early 20th century, owing to such characteristic.

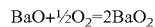  [Reaction Formula 1]

As seen from the above reaction formula, under isothermal condition, the increased partial pressure of oxygen leads to the adsorption (absorption, reaction) of oxygen, then the decreased partial pressure of oxygen leads to desorption (removal, separation, dissociation, decomposition) of oxygen. This applies to Vacuum Pressure Swing Adsorption (VPSA), so that oxygen in the air is selectively separated under high pressure more than equilibrium oxygen partial pressure, and the oxygen is removed under vacuum less than equilibrium oxygen partial pressure, thereby recovering oxygen. Here, when removing oxygen, high vacuum operation is required in order to lower the oxygen partial pressure.

Korean Patent No. 1,189,593 discloses $BaMg(CO_3)_2$ as an oxygen selective adsorbent, which rapidly adsorbs oxygen in the air, and shows high thermal stability. However, in case of applying it to the VPSA process, relatively high vacuum operating condition is required on desorption, so that apparatus and operating costs may be increased.

Therefore, the present inventors exerted all efforts to overcome the foregoing problems, and as a result, found out that a bimetallic oxide adsorbent capable of low vacuum desorption may be prepared by mixing BaMg-based oxide adsorbent with a metal inorganic element as an additive, and have completed the present invention.

SUMMARY OF THE INVENTION

The object of the present invention is to provide an oxygen selective adsorbent increasing transition (hereinafter, using the term "transition" instead of "equilibrium") oxygen partial pressure, and representing high thermal stability and excellent oxygen sorption capacity by mixing it with a metal additive, so as to be capable of desorbing oxygen under lower vacuum even at the same operating temperature than the existing oxygen selective adsorbent, and a preparation method thereof.

The present inventors repeated intensive research on an oxygen selective adsorbent, and as a result, found out that the addition of strontium and/or magnesium to barium which is an active element for oxygen adsorption increases isothermal adsorption equilibrium partial pressure, or improves the thermal stability and adsorption rate of particles, and have completed the oxygen selective adsorbent of the present invention.

In order to achieve the above objects, the present invention provides an oxygen selective adsorbent of oxide of carbonate-based compound containing Ba and Sr. The oxygen selective adsorbent comprises an oxide of $Ba_xSr_{(1-x)}Mg_y(CO_3)_{(1+y)}$ particles wherein $0<x<1$, and $0\leq y<1$; and the oxide of $Ba_xSr_{(1-x)}Mg_y(CO_3)_{(1+y)}$ particles may have a Ba:Sr mole ratio of 9:1 to 5:5, the mole number of Mg/the mole number of (Ba+Sr) of more than 0 and 2 or less, and transition oxygen partial pressure of 120-300 mmHg, or oxygen sorption capacity of 1-2.5 mmol $O_2$/g under 1 atm of oxygen.

In the oxygen selective adsorbent comprising an oxide of $Ba_xSr_{(1-x)}CO_3$ particles wherein $0<x<1$ according to another exemplary embodiment of the present invention, the $Ba_xSr_{(1-x)}CO_3$ particles may have transition oxygen partial pressure of 190-300 mmHg, or oxygen sorption capacity of 1-2 mmol $O_2$/g under 1 atm of oxygen.

Herein, the mole ratio of Ba and Sr may be 1:9 to 9:1, preferably 9:1 to 5:5, and in case of containing Mg, the mole number of Mg/the mole number of (Ba+Sr) is more than 0 and 10 or less, preferably more than 0 and 2 or less, and more preferably 0.001 to 2.

The present invention also provides a preparation method of an oxygen selective adsorbent of a carbonate-based compound containing Ba and Sr, including (a) reacting a barium-containing compound and carbonate with a strontium precursor or a magnesium precursor and a strontium precursor; and (b) drying and calcining a product prepared by step (a).

The oxygen selective adsorbent may have a mole ratio of Ba:Sr of preferably 9:1 to 5:5.

Meanwhile, the barium-containing compound may be any one selected from the group consisting of $BaCO_3$ $BaCl_2$, $Ba(NO_3)_2$, $Ba(OH)_2$ and $BaC_2O_4$, the carbonate may be any one selected from the group consisting of $Na_2CO_3$ $NaHCO_3$, $K_2CO_3$, $KHCO_3$, $(NH_4)_2CO_3$ and $NH_4HCO_3$, the magnesium precursor may be any one selected from the group consisting of $Mg(NO_3)_2$, $MgCl_2$, $Mg(OH)_2$, $MgC_2O_4$ and $Mg(CH_3COOO)_2$, and the strontium precursor may be any one selected from the group consisting of $Sr(NO_3)_2$ $SrCl_2$, $Sr(OH)_2$, $SrC_2O_4$ and $Sr(CH_3COOO)_2$.

In the method of preparing the oxygen selective adsorbent, the calcination is performed by firstly calcining at temperature of 400 to 600° C. in air atmosphere and secondly calcining at a temperature of 700 to 800° C. in air or hydrogen atmosphere.

Figure 6:
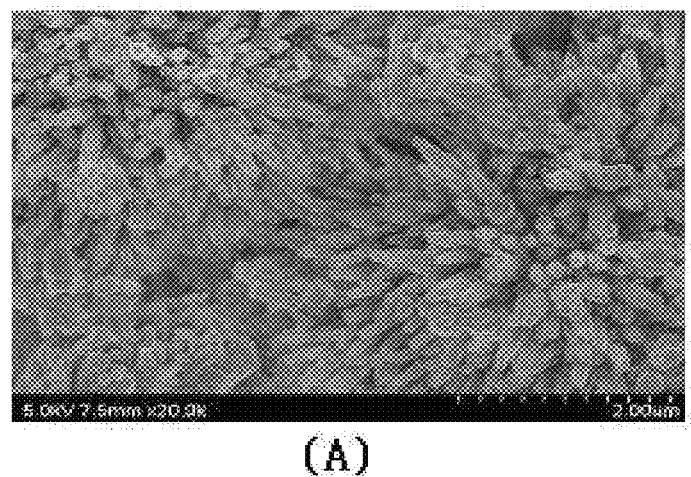
Figure 6:
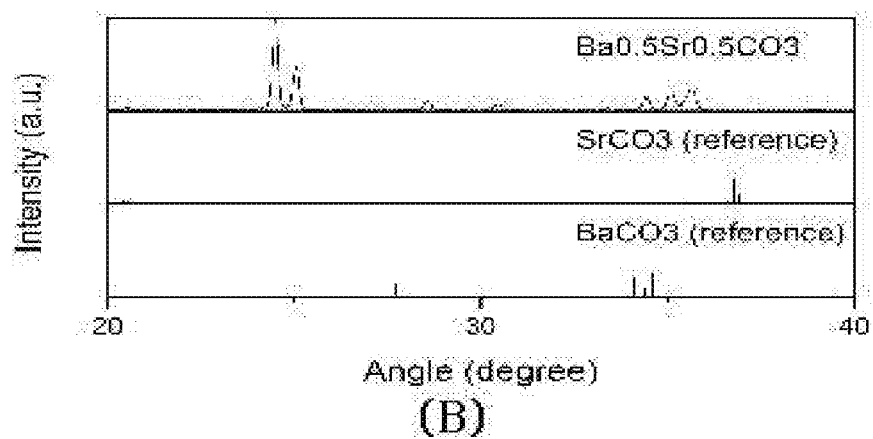

(A) of FIG. 6 shows a shape of the adsorbent, and (B) of FIG. 6 shows a structure of the adsorbent, in the oxygen selective adsorbent prepared in Example 2.

Figure 7:
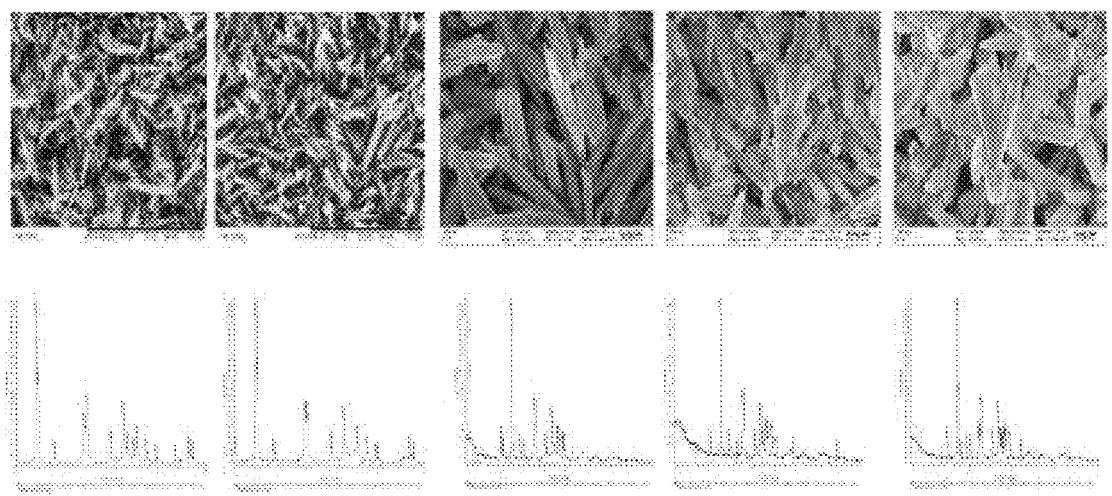

FIG. 7 shows shapes and structure of the oxygen selective adsorbents prepared in Example 3. (from left to right, Ba:Sr=0.8:0.2, 0.6:0.4, 0.5:0.5, 0.4:0.6, 0.2:0.8)

Figure 8:
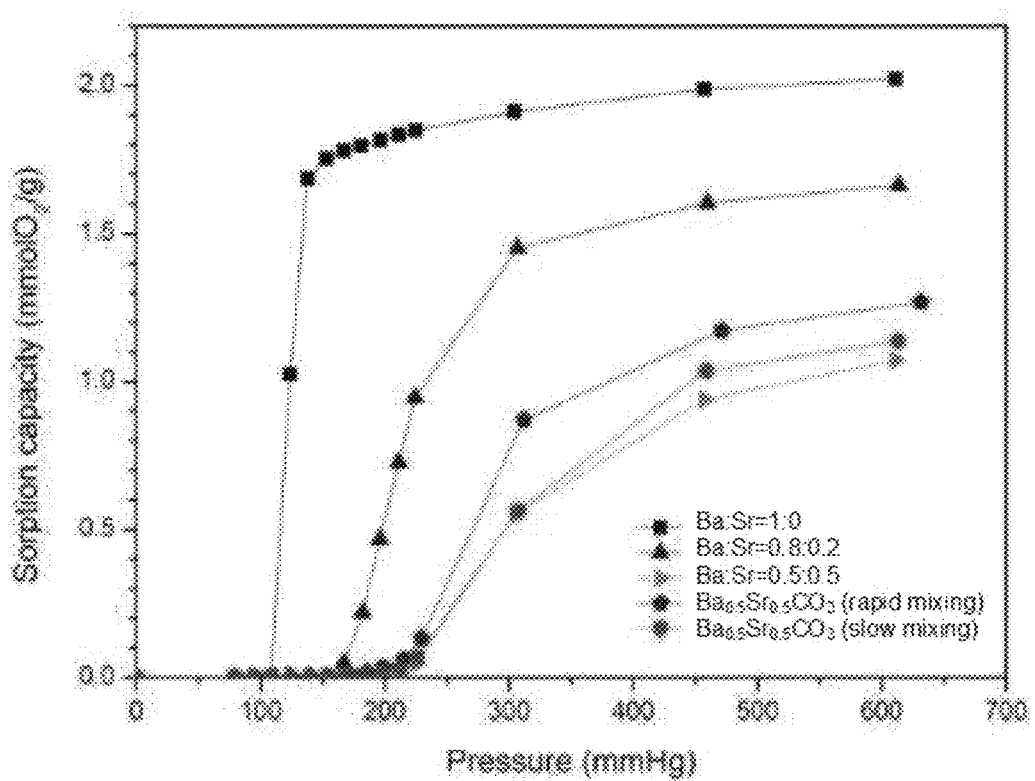

FIG. 8 shows isothermal adsorption equilibrium curves of the oxygen selective adsorbent prepared in Examples 2 (rapid mixing) and 3 (slow mixing).

Figure 9:
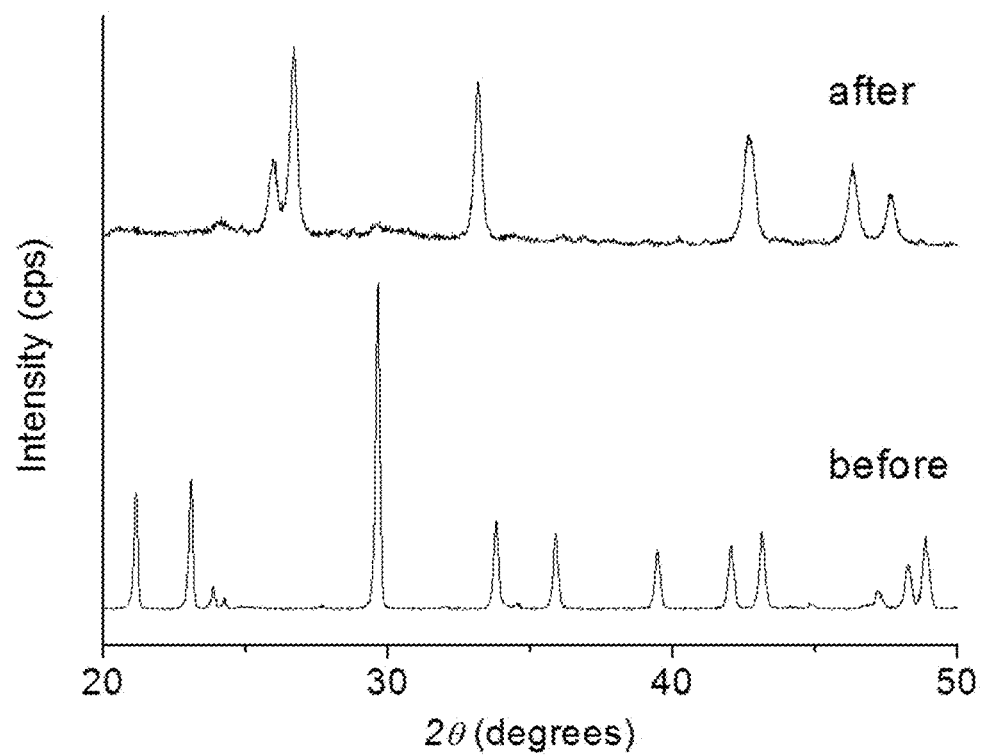

FIG. 9 shows an XRD pattern of the oxygen selective adsorbent prepared in Example 1 of the present invention before and after calcination.

Figure 10:
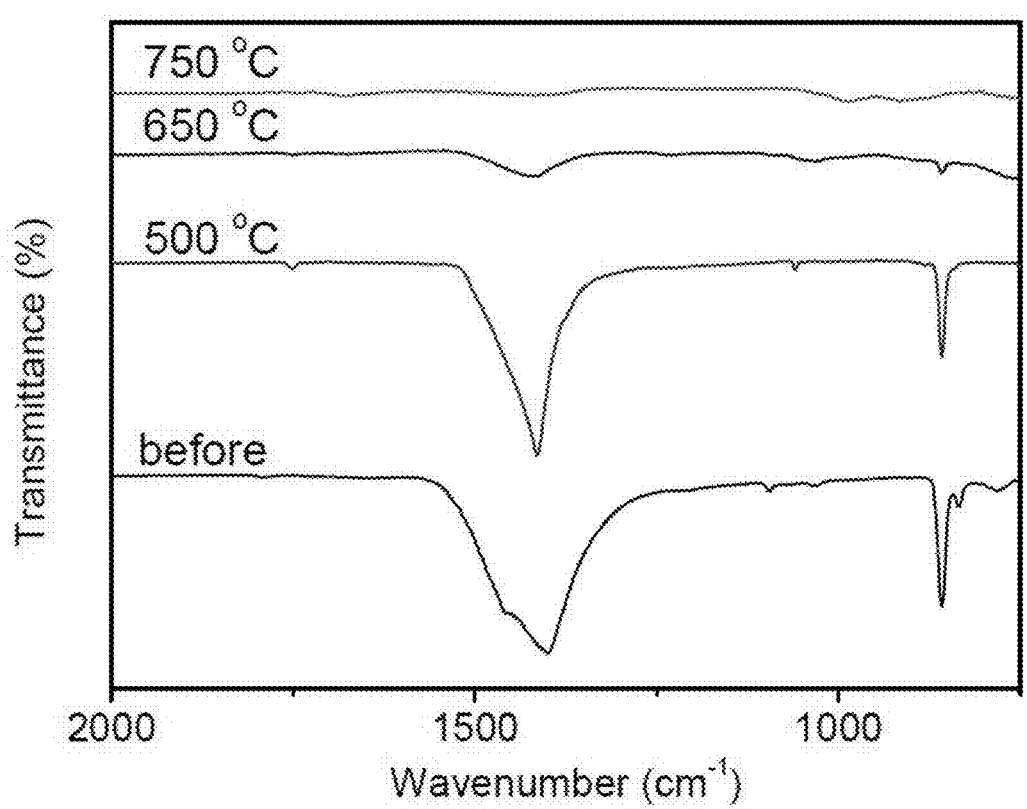

FIG. 10 shows an FT-IR spectrum of the oxygen selective adsorbent prepared in Example 1 of the present invention.

DETAILED DESCRIPTION OF THE INVENTION

Unless otherwise defined, all technical and scientific terms used herein have the same meaning as commonly understood by a person skilled in the art to which the present invention pertains. In general, the terminology used herein is well-known in the art and commonly used.

Through the specification, unless otherwise stated explicitly, "comprising" any components will be understood to imply the inclusion of other components rather than the exclusion of any other components.

In addition, in the present invention, x or y is defined as a number of more than 0 and less than 1.

Hereinafter, the constitution and the functional effect of the preferred exemplary embodiments of the present invention will be described in detail with reference to the accompanying drawings.

The present invention provides a preparation method of an oxygen selective adsorbent of an oxide of a carbonate-based compound containing Ba and Sr, including (a) reacting a barium-containing compound and carbonate with a strontium precursor or a magnesium precursor and a strontium precursor; and (b) drying and calcining a product prepared by step (a).

The preparation method of the oxygen selective adsorbent comprising an oxide of $Ba_xSr_{(1-x)}Mg_y(CO_3)_{(1+y)}$ particles according to an exemplary embodiment of the present invention may include slowly injecting a second mixed solution of a magnesium precursor and a strontium precursor to a first mixed solution of a barium-containing compound and a carbonate to react at 50 to 120° C., and then firstly calcining it at about 400 to 600° C. and secondly calcining it at about 700 to 800° C.

After the barium-containing compound and the carbonate are mixed in distilled water, they are dispersed using an ultrasonic disperser and a stirrer so as to be easily dissolved at room temperature, thereby preparing the first mixed solution, and the strontium precursor, or the magnesium precursor and the strontium precursor are mixed in distilled water, thereby preparing the second mixed solution. The second mixed solution is slowly injected to the first mixed solution, and reacted with stirring, and the product of the reaction is dried and sintered thereafter, thereby preparing the oxygen selective adsorbent of the oxide of the carbonate-based compound containing Ba and Sr.

In the method of preparing the oxygen selective adsorbent, the calcination can be performed by firstly calcining at temperature of 400 to 600° C. and secondly calcining at a temperature of 700 to 800° C. The first calcination may be performed in air atmosphere to be partially decomposed and the second calcination may be performed in air or hydrogen atmosphere, preferably in hydrogen atmosphere (99.99%) and it is completely decomposed and oxidized at this stage.

Meanwhile, the barium-containing compound may be selected from the group consisting of $BaCO_3$, $BaCl_2$, $Ba(NO_3)_2$, $Ba(OH)_2$, $BaC_2O_4$, and the like, the carbonate may be any one selected from the group consisting of $Na_2CO_3$, $NaHCO_3$, $K_2CO_3$, $KHCO_3$, $(NH_4)_2CO_3$, $NH_4HCO_3$ or the like, the magnesium precursor may be any one selected from the group consisting of $Mg(NO_3)_2$, $MgCl_2$, $Mg(OH)_2$, $MgC_2O_4$, $Mg(CH_3COO)_2$ or the like, and the strontium precursor may be any one selected from the group consisting of $Sr(NO_3)_2$, $SrCl_2$, $Sr(OH)_2$, $SrC_2O_4$, $Sr(CH_3COO)_2$ or the like.

In this case, the mole ratio of Ba and Sr may be 1:9 to 9:1, preferably 9:1 to 5:5, and the mole number of Mg/the mole number of (Ba+Sr) may be more than 0 and 10 or less, preferably more than 0 and 2 or less, more preferably 0.001 to 2. In case that the mole number of Ba is high relative to Sr, there is an advantage of increased oxygen partial pressure, but an amount of oxygen adsorption may be reduced. Thus, the above limited scope is advantageous. In addition, if the mole number of Mg/the mole number of (Ba+Sr) is in the above range, an oxide of the carbonate-based compound containing Ba and Sr such as $Ba_xSr_{(1-x)}Mg_y(CO_3)_{(1+y)}$ is predominantly precipitated.

In the oxygen selective adsorbent containing oxide of $Ba_xSr_{(1-x)}Mg_y(CO_3)_{(1+y)}$ particles according to another exemplary embodiment of the present invention, the oxide of $Ba_xSr_{(1-x)}Mg_y(CO_3)_{(1+y)}$ particles may have transition oxygen partial pressure of 120-300 mmHg, or oxygen sorption capacity of 1-2.5 mmol $O_2$/g under 1 atm of oxygen.

In above $Ba_xSr_{(1-x)}Mg_y(CO_3)_{(1+y)}$, it is preferred that mole of Ba:mole of Sr is 9:1-5:5. An X-ray diffraction analysis, an adsorption isothermal line, a scanning microscope analysis, and adsorption/desorption rate for various mole ratios are represented in FIGS. 1 to 5. If the mole ratio of Ba to Sr is excessively high, that is, higher than 9, the adsorption equilibrium partial pressure is excessively increased, thereby requiring high vacuum, and if the mole ratio of Ba to Sr is less than 5:5, the amount of oxygen adsorption is reduced.

In addition, in the oxygen selective adsorbent, oxide of $Ba_xSr_{(1-x)}Mg_y(CO_3)_{(1+y)}$ particles of the present invention, magnesium has a function of increasing adsorption rate of the adsorbent, and imparting a thermal stability. In this case also, the mole number of Mg/the mole number of (Ba+Sr) is more than 0 and 10 or less, preferably more than 0 and 2 or less and more preferably 0.001 to 2. If the mole ratio is over 10, the amount of oxygen adsorption is reduced, and if the adsorption/desorption is carried out at high temperature of 600° C. or more, Mg may be added in the mole ratio of Mg to Ba of 0.1 or more, in order to increase a thermal stability.

In the oxygen selective adsorbent containing oxide of $Ba_xSr_{(1-x)}CO_3$ particles according to another exemplary embodiment of the present invention, the $Ba_xSr_{(1-x)}CO_3$ particles may have transition oxygen partial pressure of 190-300 mmHg, or oxygen sorption capacity of 1-2 mmol $O_2$/g under 1 atm of oxygen.

The X-ray diffraction analysis, the adsorption isothermal line, the scanning microscope analysis, and the adsorption/desorption rate of the $Ba_xSr_{(1-x)}CO_3$ particles prepared by a rapid mixing method wherein a mixed-solution of a barium-containing compound and a strontium-containing compound is directly mixed with an ammonium carbonate aqueous solution, or a slow feeding method wherein a mixed solution of a barium-containing compound and a strontium-containing compound, and an ammonium carbonate aqueous solution are mixed with slowly feeding respectively, are shown in FIGS. 6 to 8. In addition, in FIG. 8, the adsorption isothermal lines of the $Ba_xSr_{(1-x)}Mg_y(CO_3)_{(1+y)}$ particles with magnesium are shown together, and compared. The particles without magnesium show a result of adsorption equilibrium partial pressure similar to the particles with magnesium, but have an adsorption amount increased by 10-20% compared with the particles with magnesium.

EXAMPLES

Example 1: Preparation of $Ba_xSr_{(1-x)}Mg_y(CO_3)_{(1+y)}$ 4 g of $BaCO_3$ powder (0.02 mole) and 4.3 g of $Na_2CO_3$ (0.04 mole) were mixed in 200 mL of distilled water, and dispersed using an ultrasonic disperser and a stirrer for 30 minutes to be dissolved well at room temperature. The dispersed solution was transferred on a round flask positioned on a stirring mantle capable of precise temperature control, and heated at 90° C. with stirring. A condenser was mounted in the round flask to condense evaporated water using cooling water at 15° C. and reflux it. 10.39 g of $Mg(NO_3)_2 \cdot 6H_2O$ (0.04 mole) and 4.23 g of $Sr(NO_3)_2$ (0.02 mole) were mixed in 100 mL of distilled water, and the mixed solution was slowly injected using a metering pump at a rate of 0.36 mL/min to the previously prepared mixed solution containing Ba. After the injection was completed, further stirring at the same temperature was carried out for 4 hours to complete the reaction. White suspension was vacuum filtered (pore size 5 μm), and washed with about 2,000 mL of distilled water to remove remaining ions. Prepared carbonate crystalline particles were dried in an oven at 120° C. for a day, sintered under atmosphere at 500° C. for about 3 hours, and then sintered under hydrogen (99.99%) at 1 atm and 750° C. and processed into fine powder using a sieve of 100 μm.

Meanwhile, mixing was carried out with the mixing ratio of Ba and Sr of 1:0, 0.9:0.1, 0.8:0.2, 0.7:0.3, 0.6:0.4 and 0.5:0.5, respectively, based on their precursor mole number. In this case, the sum of mole number of Ba and Sr was set to 0.04 mole. Each practicing condition is summarized in the following Table 1.

Herein, in the elemental ratio of Ba and Sr, x:(1−x), x is more than 0 less than 1. The mole number of Mg was the same as that of (Ba+Sr), but not limited thereto.

TABLE 1

| Experimental conditions | | | | |
|---|---|---|---|---|
| Test number | Ba (mole) | Sr (mole) | Mg (mole) | Ba(x):Sr(1 − x) (mole) |
| Test 1 | 0.036 | 0.004 | 0.04 | 0.9:0.1 |
| Test 2 | 0.032 | 0.008 | 0.04 | 0.8:0.2 |
| Test 3 | 0.028 | 0.012 | 0.04 | 0.7:0.3 |
| Test 4 | 0.024 | 0.016 | 0.04 | 0.6:0.4 |
| Test 5 | 0.020 | 0.020 | 0.04 | 0.5:0.5 |

Comparative Example 1: Preparation of BaMg(CO$_3$)$_2$ (in the Same Manner as Example 1 Except for Addition of Sr(NO$_3$)$_2$)

8 g of BaCO$_3$ powder (0.04 mole) and 4.3 g of Na$_2$CO$_3$ (0.04 mole) were mixed in 200 mL of distilled water, and dispersed using an ultrasonic disperser and a stirrer for 30 minutes to be dissolved well at room temperature. The dispersed solution was transferred on a round flask positioned on a stirring mantle capable of precise temperature control, and heated at 90° C. with stirring. A condenser was mounted in the round flask to condense evaporated water using cooling water at 15° C. and reflux it. 10.39 g of Mg(NO$_3$)$_2$6H$_2$O (0.04 mole) was mixed with 100 mL of distilled water, and the mixed solution was slowly injected using a metering pump at a rate of 0.36 mL/min to the previously prepared mixed solution containing Ba. After the injection was completed, further stirring at the same temperature was carried out for 4 hours to complete the reaction. White suspension was vacuum filtered (pore size 5 µm), and washed with about 2,000 mL of distilled water to remove remaining ions. Prepared crystalline particles were dried in an oven at 120° C. for a day, then sintered under atmosphere at 500° C. for about 3 hours, and processed into fine powder using a sieve of 100 µm.

Experimental Example 1: Powder X-Ray Diffraction Analysis

Figure 1:
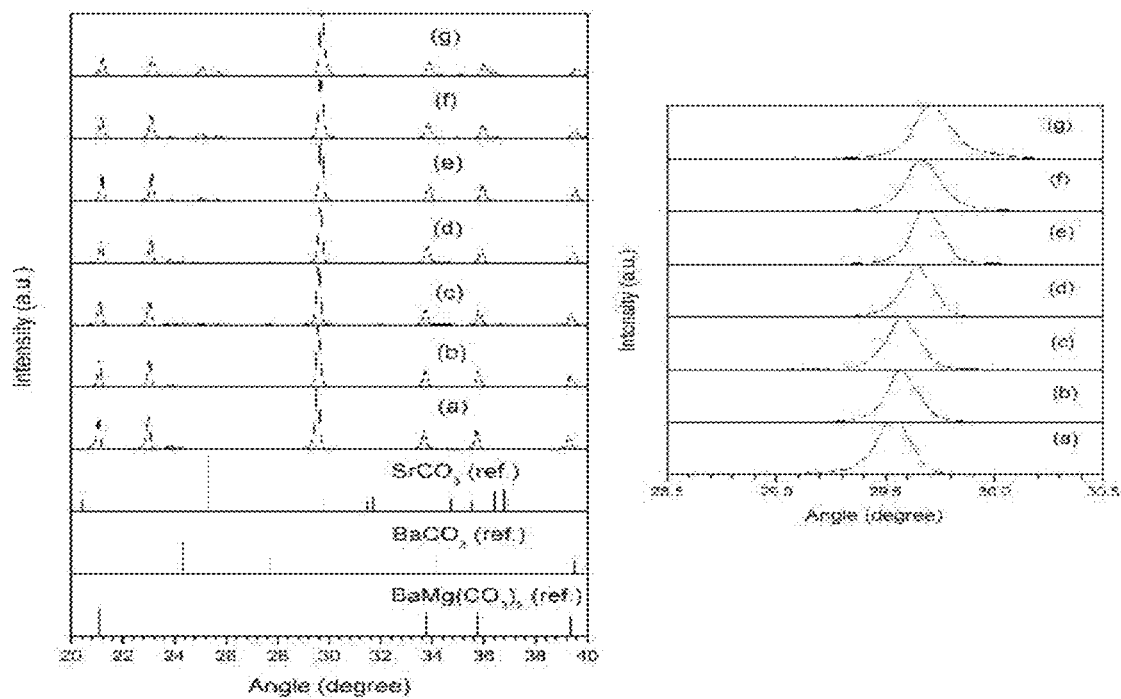
FIG. 1 shows a change of powder XRD patterns of the oxygen selective adsorbents mixed with a Sr additive, prepared in Example 1. (Ba:Sr=(a) 1:0, (b) 0.95:0.05, (c) 0.9:0.1, (d) 0.8:0.2, (e) 0.7:0.3, (f) 0.6:0.4, (g) 0.5:0.5) [(left) measured at 20° ~60°, (right) expanded range of 28.5° ~30.5)]

Filtered and dried particles were analyzed on their crystal structure using powder X-ray diffraction, and the result is shown in FIG. 1. Compared with the particles without a Sr additive, as the amount of injected Sr increases, and that of injected Ba decreases, the characteristic peak of BaMg(CO$_3$)$_2$ was shifted to a higher angle (right side in FIG. 1). This is because Ba is partially replaced with Sr, so that BaMg(CO$_3$)$_2$ is changed to Ba$_x$Sr$_{(1-x)}$Mg$_y$(CO$_3$)$_{(1+y)}$, that is, the lattice size is decreased due to the replacement of Ba with smaller Sr. Meanwhile, when the concentration of injected Ba is decreased and that of the Sr additive is increased, the peak of some BaCO$_3$ present in a small amount is decreased, and the peak of SrCO$_3$ is gradually increased, but overall, the structure of (Ba,Sr)Mg(CO$_3$)$_2$ was prominent in the composition of the product.

Experimental Example 2: Scanning Electron Microscope Analysis

Figure 3:
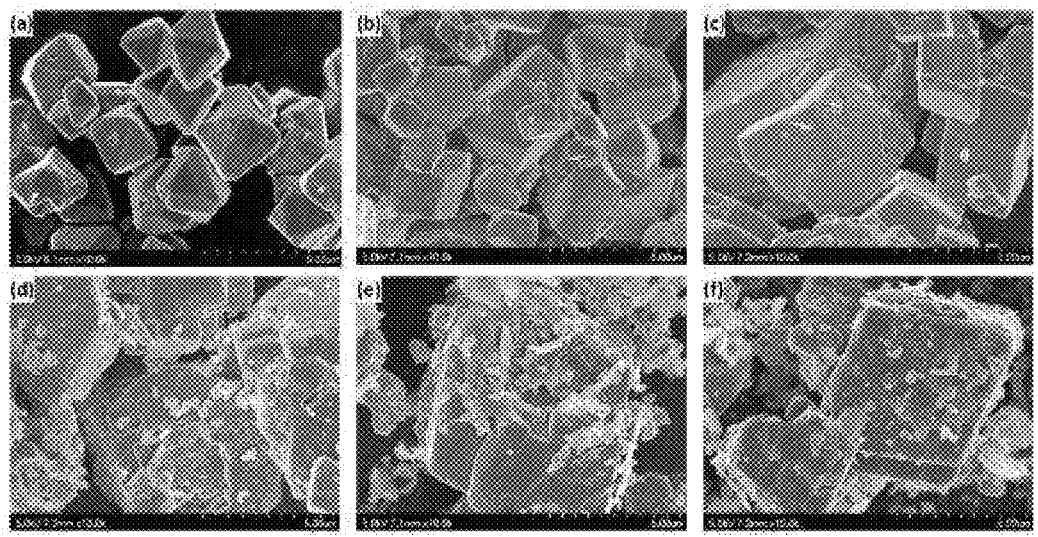
FIG. 3 is SEM images of the oxygen selective adsorbent mixed with a Sr additive in a crystalline form, prepared in Example 1. (Ba:Sr=(a) 1:0, (b) 0.9:0.1, (c) 0.8:0.2, (d) 0.7:0.3, (e) 0.6:0.4, (f) 0.5:0.5)

The result of analyzing the shape of the prepared crystalline particles using a scanning electron microscope is shown in FIG. 3, and the produced crystalline particles without a Sr additive had similar shape to a truncated octahedron having a size of 1-3 µm. However, as the concentration of the additive is increased, the particles showed a cubic shape, and had a larger size of 3-5 µm. If the concentration of the Sr additive is high, it appeared that some small amorphous SrCO$_3$ particles were produced and attached to the surface of cubic Ba$_x$Sr$_{(1-x)}$Mg$_y$(CO$_3$)$_{(1+y)}$ and the like.

Experimental Example 3: Composition of Adsorbent Element

In order to identify the ratios of metal elements present in the produced particles, inductive coupled plasma-atomic emission spectroscopy (ICP-AES) was used. As represented in the following Table 2, the mixing ratios of Ba, based on the concentration of the injected solution and based on the concentration in the prepared solid carbonate crystal were similar to each other. Meanwhile, Ba concentration in the particle without an additive was 4.03 mmol/g-powder, which is higher than Mg concentration of 3.80 mmol/g-powder, and higher than calculated Ba concentration in pure BaMg(CO$_3$)$_2$ crystal of 3.55 mmol/g-powder, thus, indicating the presence of some BaCO$_3$.

TABLE 2

Metal element compositional ratios of crystalline particles prepared by mixing with an Me$_A$ additive (#concentration of injected solution, *concentration in prepared solid carbonate crystal)

| | [Ba]/([Ba] + [Sr])# | | | | | |
|---|---|---|---|---|---|---|
| | 1 | 0.95 | 0.9 | 0.8 | 0.6 | 0.5 |
| Ba (mmol/g-powder)* | 4.03 | 3.65 | 3.41 | 3.29 | 2.8 | 2.27 |
| Sr (mmol/g-powder)* | 0 | 0.29 | 0.37 | 0.79 | 1.83 | 2.17 |
| Mg (mmol/g-powder)* | 3.80 | 3.79 | 3.78 | 3.90 | 3.87 | 3.84 |
| Na (mmol/g-powder)* | 0.42 | 0.72 | 0.34 | 0.40 | 0.43 | 0.37 |
| [Ba]/([Ba] + [Sr])* | 1.0 | 0.927 | 0.902 | 0.807 | 0.604 | 0.511 |

Experimental Example 4: Measurement of Isothermal Adsorption Equilibrium Curves In order to obtain an isothermal adsorption equilibrium data of the oxygen selective adsorbents, vacuum gravimetry was used in this study. When a chamber of a thermal gravimetric analyzer was maintained at a constant temperature under vacuum condition, oxygen was slowly injected while a separately mounted pressure gauge was monitored. When the oxygen pressure to be adsorbed was reached, the injection of oxygen was stopped, and such state was maintained for 1 hour, so as to record the weight change of the adsorbent. When the adsorption was completed, the experiment proceeded in a manner that oxygen was slowly injected until the next oxygen pressure was reached. Meanwhile, since the weight of a scale is changed by a buoyancy effect caused by vacuum pressure, a blank test without a sample was carried out under the same pressure condition, in order to calibrate the difference.

Figure 2:
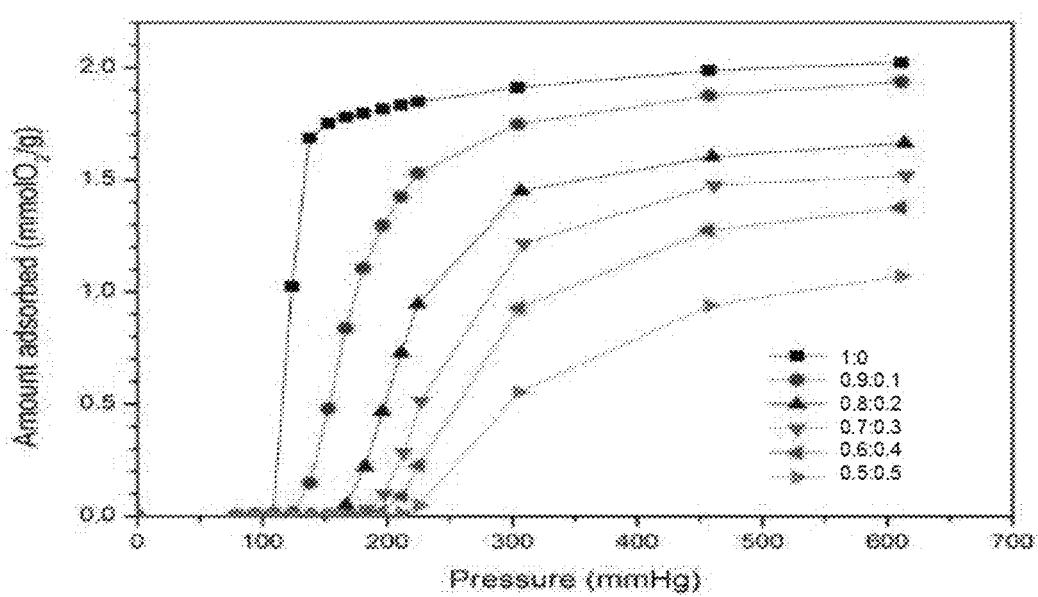
FIG. 2 shows isothermal oxygen adsorption equilibrium lines of the oxygen selective adsorbent prepared in Example 1 at 700° C.

The result is shown in FIG. 2. When a Sr additive is used, as the mixing mole ratio of Ba:Sr is reduced from 1:0 in Comparative Example to 0.9:0.1, 0.8:0.2, 0.7:0.3, 0.6:0.4 and 0.5:0.5, respectively, the adsorption equilibrium partial pressure was increased from 108 mmHg to 124, 167, 197, 211 and 225 mmHg, respectively. In the course of conversion of BaO into BaO$_2$ by the reaction with O$_2$, the Sr additive stabilized a BaO phase to change the equilibrium curve. Meanwhile, as the mixing ratio of the additive is higher, the amount of oxygen adsorption was decreased from 2.08 mmol/g to 1.94, 1.66, 1.52, 1.38, 1.07 mmol/g, respectively. In practice, the adsorption amount at a mixing ratio of 0.5:0.5 was 1.07 mmol/g, which is about half of 2.08 mmol/g under the condition without the additive. Thus, optimization of the amount of oxygen adsorption, regeneration pressure and adsorption temperature is required in the actual oxygen adsorption process.

Experimental Example 5: Adsorption/Desorption Rate

Figure 4:
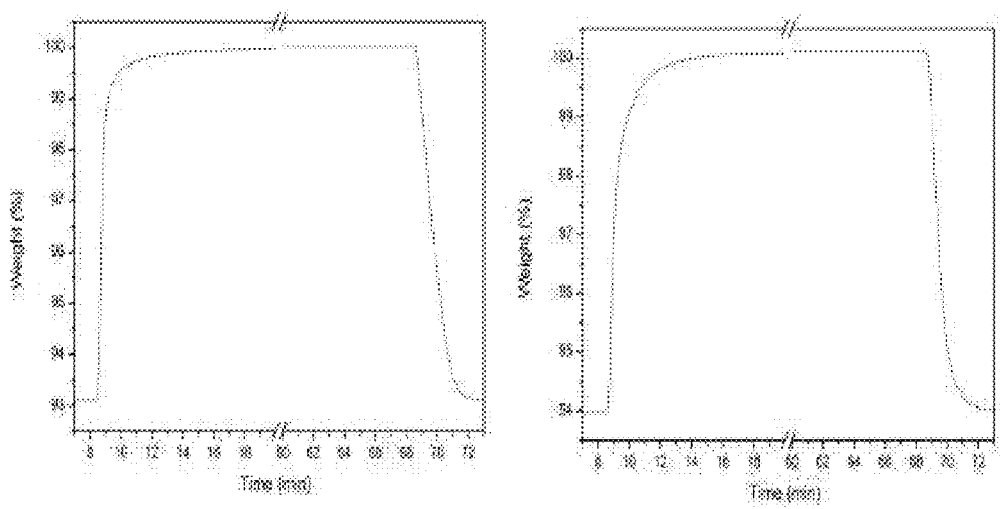
FIG. 4 shows adsorption/desorprtion rate of a BaMg-based oxide adsorbent prepared in Example 1 at 700° C. [(left) without an additive (right) Ba:Sr=0.8:0.2]

FIG. 4 shows the result of measuring oxygen adsorption rate and desorption rate using normal pressure thermogravimetry. The oxygen adsorption was carried out using the sintered oxygen adsorbent, by injecting 90 mL/min of oxygen and 10 mL/min of Ar with mixing at 700° C., and measuring a weight change for 1 hour, then injecting 100 mL/min of Ar at the same temperature, and measuring a weight change for 1 hour. When the time required to reach 80% of a new equilibrium adsorption amount in one equilibrium state is defined as a relaxation time, $t_{80}$, the adsorption time for an adsorbent without Sr was 38 seconds. In case of desorption, the adsorption time was about 130 seconds. Meanwhile, in case of a bimetallic oxide adsorbent containing Ba and a Sr additive in a ratio of 0.8:0.2, the adsorption time was 66 seconds which is slower than that of the adsorbent without an Sr additive, but applicable to a process, and the desorption time was measured as being 72 seconds which is faster. Thus, it appeared that Sr functions advantageously to desorption.

Experimental Example 6: Stability Evaluation

Figure 5:
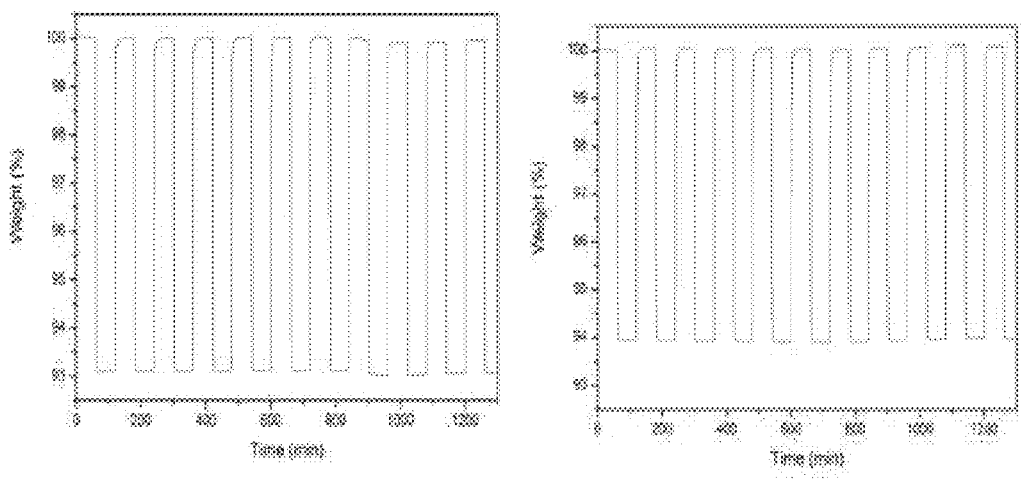
FIG. 5 is a graph representing the evaluation result of repetitive oxygen adsorption and desorption of the oxygen selective adsorbent prepared in Example 1 at 700° C. [(left) without an additive (right) Ba:Sr=0.8:0.2]

FIG. 5 shows the result of stability evaluation at high temperature by alternating oxygen injection and Ar injection to repeat the evaluation 10 times. As a result, in both cases of the adsorbents with and without the additive, the oxygen adsorption amount was constant during 10 times of evaluation for 20 hours, and the slowing phenomenon of adsorption/desorption rate was not observed.

Example 2: Preparation of $Ba_xSr_{(1-x)}CO_3$

An adsorbent having Ba and Sr mixed therein except for Mg was prepared, so as to measure an oxygen adsorption equilibrium. 13.068 g of $Ba(NO_3)_2$ (0.05 mole) and 10.58 g of $Sr(NO_3)_2$ (0.05 mole) were mixed in 100 mL of distilled water, transferred to a round flask positioned on a stirring mantle capable of precise temperature control, and heated at 90° C. with stirring. A condenser was mounted in the round flask to condense evaporated water using cooling water at 15° C. and reflux it. 9.609 g of $(NH_4)_2CO_3$ (0.1 mole) was mixed in 100 mL of distilled water, then rapidly mixed with the previously prepared mixed solution containing Ba/Sr, and stirred. Further stirring at the same temperature was carried out for 4 hours to complete the reaction. White suspension was vacuum filtered (pore size 5 μm), and washed with about 2,000 mL of distilled water to remove remaining ions. Prepared crystalline particles were dried in an oven at 120° C. for a day, sintered under atmosphere at 500° C. for about 3 hours, and sintered under hydrogen (99.99%) at 1 atm 750° C. and processed into fine powder using a sieve of 100 μm.

Experimental Example 7: Scanning Electron Microscopic Analysis and Powder X-Ray Diffraction Analysis As a result of analysis of the shape of the crystalline particles prepared in Example 2 using a scanning electron microscope, as shown in (A) of FIG. 6, the crystalline particles produced by mixing Ba and Sr in a ratio of 0.5:0.5 represented a needle-shape.

Filtered and dried particles were analyzed on their crystal structure using powder X-ray diffraction, and the result is shown in 6(B) of FIG. 6. Since the peak of a carbonate of $Ba_{0.5}Sr_{0.5}CO_3$ produced when mixing Ba and Sr in a ratio of 0.5:0.5 was positioned in the middle between the characteristic peaks of $BaCO_3$ and $SrCO_3$, it appeared that Ba and Sr were uniformly mixed. This is because by the addition of Sr which is smaller than Ba, Ba was partially replaced with Sr, so that $BaCO_3$ was changed to $Ba_xSr_{(1-x)}CO_3$, that is, the lattice size is decreased due to the replacement of Ba with smaller Sr. Meanwhile, it is appreciated that $Ba_xSr_{(1-x)}CO_3$ prepared by the present Examples contains Ba and Sr uniformly mixed therein, differently from the case that when $BaCO_3$ and $SrCO_3$ were simply mixed, their peaks were separated.

Example 3: Preparation of $Ba_xSr_{(1-x)}CO_3$

It was prepared in a manner of slowly mixing the adsorbent having Ba and Sr mixed therein, except for Mg. 5.227 g of $Ba(NO_3)_2$ (0.02 mole) and 4.232 g of $Sr(NO_3)_2$ (0.02 mole) were mixed in 100 mL of distilled water, transferred to a round flask positioned on a stirring mantle capable of precise temperature control, and heated at 90° C. with stirring. A condenser was mounted in the round flask to condense evaporated water using cooling water at 15° C. and reflux it. 0.9609 g of $(NH_4)_2CO_3$ (0.01 mole) was mixed with 100 mL of distilled water, and the mixed solution was slowly injected using a metering pump at a rate of 0.36 mL/min to the previously prepared mixed solution containing Ba/Sr. After the injection was completed, further stirring at the same temperature was carried out for 4 hours to complete the reaction. White suspension was vacuum filtered (pore size 5 μm), and washed with about 2,000 mL of distilled water to remove remaining ions. Prepared crystalline particles were dried in an oven at 120° C. for a day, then sintered under atmosphere at 500° C. for about 3 hours, and sintered under hydrogen (99.99%) at 1 atm, 750° C., and processed into fine powder using a sieve of 100 μm. Each Ba/Sr mixing ratio is shown in Table 3.

TABLE 3

| | Experimental conditions | | |
| Test Number | Ba (mole) | Sr (mole) | Ba(x):Sr(1 − x) (mole) |
| --- | --- | --- | --- |
| Teat 1 | 0.036 | 0.004 | 0.8:0.2 |
| Test 2 | 0.024 | 0.016 | 0.6:0.4 |
| Test 3 | 0.020 | 0.020 | 0.5:0.5 |
| Test 4 | 0.016 | 0.024 | 0.4:0.6 |
| Test 5 | 0.004 | 0.036 | 0.2:0.8 |

Experimental Example 8: Scanning Electron Microscopic Analysis and Powder X-Ray Diffraction Analysis As a result of analysis of the shape of the crystalline particles prepared in Example 3 using a scanning electron microscope, as shown in FIG. 7, the produced crystalline particles represented a needle-shape.

Filtered and dried particles were analyzed on their crystal structure using powder X-ray diffraction, and the result is also included in FIG. 7. As Sr was increased by controlling the mixing ratio of Ba and Sr, the diffraction peak was shifted to a larger angle, which confirmed that Ba was replaced with Sr to be uniformly mixed.

Experimental Example 9: Measurement of Isothermal Adsorption Equilibrium Curve

FIG. 8 shows measured isothermal adsorption curves of the adsorbents prepared from Examples 2 and 3. The adsorption equilibrium partial pressure was increased with only Ba and Sr, without Mg. The adsorption equilibrium partial pressure of the adsorbents of Examples 2 and 3 having Ba and Sr in 0.5:0.5 without Mg, was 215 mmHg and 226 mmHg, respectively, which appeared to be similar to 225 mmHg in the case of the adsorbent containing Mg wherein Ba:Sr:Mg=0.5:0.5:1. The adsorption amount of the adsorbents of Examples 2 and 3 having Ba and Sr in 0.5:0.5 without Mg was 1.27 mmol/g and 1.13 mmol/g, respectively, which is higher than 1.07 mmol/g of the adsorbent containing Mg.

Experimental Example 10: XRD Pattern Measurement of Adsorbent Powder Before and after Calcination As shown in FIG. 9, after calcination of $Ba_xSr_{(1-x)}Mg(CO_3)_2$=0.8) at 750° C. in Example 1, the carbonate salt peak nearly disappears. The adsorbent finally exists as an oxide of $Ba_xSr_{(1-x)}O/MgO$, which is observed in the XRD results in the form of adsorbing oxygen in contact with oxygen in the atmosphere (FIG. 9). Therefore, almost all the carbonate seems to be converted to its oxide, which is considered to be due to decomposition of the carbonate of the three elements, resulting in the release of carbon dioxide and formation of a oxide of three elements. These phenomena and evidence can be proved by XRD results of Taesung Jung et al. (Taesung Jung et al., *Chemical Engineering Science*, 137, 532-540, 2015, FIGS. 2 and 4). This conversion is also observed regardless of the value of x.

Experimental Example 11: FT-IR Pattern Measurement of Adsorbent According to Calcination Temperature The presence of carbonate ion in the adsorbent was confirmed by observing peak of carbonate ion, i.e. $CO_3^{2-}$ (asymmetric stretch, around 1440 $cm^{-1}$) using Fourier transform infrared spectroscopy (FT-IR). As shown in FIG. 10, strong carbonate ion peak was observed before calcination to confirm that precursor $Ba_xSr_{(1-x)}Mg(CO_3)_2$ has carbonate form. However, when calcination at 500° C. and 600° C., it was confirmed that as the temperature was increased, the carbonate ion was decomposed by decreasing the peak of carbonate ion. When the calcination temperature was at least 750° C., the peak of the carbonate ion completely disappeared and the carbonate was confirmed to be almost decomposed. Therefore, it was confirmed from the XRD and FT-IR results of the powder of Experimental Example 9 that the carbonate precursor of $Ba_xSr_{(1-x)}Mg(CO_3)_2$ was converted to the oxide of $Ba_xSr_{(1-x)}O/MgO$.

INDUSTRIAL APPLICABILITY

The present invention can provide an oxygen selective adsorbent capable of removing and recovering oxygen even under low vacuum (high oxygen partial pressure) and a preparation method thereof by adding another metal such as Sr to Ba which is an active element for oxygen adsorption and calcining them.

The present invention has been described in detail above in specific parts, and it is obvious that such specific technique is only a preferred embodiment to a person skilled in the art, without limiting the scope of the present invention.

Thus, the substantial scope of the present invention will be defined by the appended claims and their equivalents.

What is claimed is:

1. An oxygen selective adsorbent comprising an oxide of $Ba_xSr_{(1-x)}Mg_y(CO_3)_{(1+y)}$ particles, wherein 0<x<1, and 0<y<1; wherein the $Ba_xSr_{(1-x)}Mg_y(CO_3)_{(1+y)}$ particles have Ba:Sr mole ratio of 9:1 to 6:4.

2. The oxygen selective adsorbent of claim 1, wherein the oxide of $Ba_xSr_{(1-x)}Mg_y(CO_3)_{(1+y)}$ particles have Ba:Sr mole ratio of 9:1 to 7:3.

3. The oxygen selective adsorbent of claim 2, wherein the oxide of $Ba_xSr_{(1-x)}Mg_y(CO_3)_{(1+y)}$ particles have transition oxygen partial pressure of 120-300 mmHg.

4. The oxygen selective adsorbent of claim 2, wherein the oxide of the $Ba_xSr_{(1-x)}Mg_y(CO_3)_{(1+y)}$ particles have oxygen sorption capacity of 1-2.5 mmol $O_2$/g under 1 atm of oxygen.

5. The oxygen selective adsorbent of claim 1, wherein a mole number of Mg/a mole number of (Ba+Sr) is more than 0 and 1 or less.

6. The oxygen selective adsorbent of claim 5, wherein the oxide of $Ba_xSr_{(1-x)}Mg_y(CO_3)_{(1+y)}$ particles have transition oxygen partial pressure of 120-300 mmHg.

7. The oxygen selective adsorbent of claim 5, wherein the oxide of the $Ba_xSr_{(1-x)}Mg_y(CO_3)_{(1+y)}$ particles have oxygen sorption capacity of 1-2.5 mmol $O_2$/g under 1 atm of oxygen.

8. The oxygen selective adsorbent of claim 1, wherein the oxide of $Ba_xSr_{(1-x)}Mg_y(CO_3)_{(1+y)}$ particles have transition oxygen partial pressure of 120-300 mmHg.

9. The oxygen selective adsorbent of claim 1, wherein the oxide of the $Ba_xSr_{(1-x)}Mg_y(CO_3)_{(1+y)}$ particles have oxygen sorption capacity of 1-2.5 mmol $O_2$/g under 1 atm of oxygen.

10. A method of preparing the oxygen selective adsorbent of claim 1, comprising:
    (a) reacting a barium-containing compound and carbonate with a strontium precursor, or a magnesium precursor and a strontium precursor; and
    (b) drying and calcining a product prepared by step (a).

11. The method of preparing an oxygen selective adsorbent of claim 10, wherein a mole number of Mg/a mole number of (Ba+Sr) is more than 0 and 1 or less.

12. The method of preparing an oxygen selective adsorbent of claim 10, wherein the barium-containing compound is selected from the group consisting of $BaCO_3$ $BaCl_2$, $Ba(NO_3)_2$, $Ba(OH)_2$ and $BaC_2O_4$; and
    the carbonate is selected from the group consisting of $Na_2CO_3$ $NaHCO_3$, $K_2CO_3$, $KHCO_3$, $(NH_4)_2CO_3$ and $NH_4HCO_3$.

13. The method of preparing an oxygen selective adsorbent of claim 10, wherein the magnesium precursor is selected from the group consisting of $Mg(NO_3)_2$, $MgCl_2$, $Mg(OH)_2$, $MgC_2O_4$ and $Mg(CH_3COOO)_2$.

14. The method of preparing an oxygen selective adsorbent of claim 10, wherein the strontium precursor is selected from the group consisting of $Sr(NO_3)_2$ $SrCl_2$, $Sr(OH)_2$, $SrC_2O_4$ and $Sr(CH_3COOO)_2$.

15. The method of preparing an oxygen selective adsorbent of claim 10, wherein the calcining comprises: firstly calcining at temperature of 400 to 600° C. in air atmosphere and secondly calcining at a temperature of 700 to 800° C. in air or hydrogen atmosphere.

\* \* \* \* \*